US007340619B2

United States Patent
Wang et al.

(10) Patent No.: US 7,340,619 B2
(45) Date of Patent: *Mar. 4, 2008

(54) SYSTEM AND METHOD FOR CIRCULATING POWER USAGE INFORMATION ON A CLOSED RING COMMUNICATION PATH WITHIN A MULTI-NODE COMPUTER SYSTEM

(75) Inventors: Liyong Wang, Wappingsers Falls, NY (US); Kevin W. Kark, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 380 days.

This patent is subject to a terminal disclaimer.

(21) Appl. No.: 11/082,123

(22) Filed: Mar. 16, 2005

(65) Prior Publication Data

US 2006/0212726 A1    Sep. 21, 2006

(51) Int. Cl.
*G06F 1/00*    (2006.01)
(52) U.S. Cl. ...................... 713/300; 713/340
(58) Field of Classification Search ............. 713/300, 713/320, 322, 324, 340
See application file for complete search history.

(56) References Cited

U.S. PATENT DOCUMENTS 6,167,524 A * 12/2000 Goodnow et al. .......... 713/300
6,587,950 B1 * 7/2003 Shah et al. ................. 713/300
6,802,014 B1 * 10/2004 Suurballe ................... 713/300
2003/0079150 A1 * 4/2003 Smith et al. ............... 713/320
2004/0030944 A1 * 2/2004 Barr et al. .................. 713/400

* cited by examiner

*Primary Examiner*—Thomas Lee
*Assistant Examiner*—Mark Connolly
(74) *Attorney, Agent, or Firm*—Lynn L. Augspurger (57) ABSTRACT

A method of regulating power for multi-node computer system components has a closed-ring path that links all the power governors and circulating in the ring is a system power number that represents the power consumption of the entire system. Meanwhile, all the governors keep counting its local power consumption. Each time the number passes a governor, the governor will add its local count onto this number, store this number for future usage, and reset its local count. When the new number returns back to the same power governor, the governor will subtract the new number with its stored number to calculate the overall system power usage within a number circulation period. The system power number overflow problem is also detected with a counter if the incoming number is smaller then the number previously stored. The counter whose counting capacity is greater than the maximum system power usage on all the nodes within a number circulation period. A single number transfer mode and multiple number transfer mode and heterogeneous multi-node components which could have different power usage configurations are employed.

9 Claims, 8 Drawing Sheets

An example of how local count number is added onto the system power number within a node.

FIGURE 1

An example of prior art of power governor design for a single-node system

FIGURE 2

An example of new power governor design in a multi-node system. A closed ring is implemented.

FIGURE 3

An example of how local count number is added onto the system power number within a node.

FIGURE 4

An example of calculation of total power consumption within a number circulation period.

FIGURE 5

An example of an overflow situation while the system power number is circulating in the ring.

FIGURE 6

An example of the solution of the overflow situation of the system power number in the ring.

FIGURE 7

Single-number transfer mode versus multiple-transfer mode.

Single value transfer mode

Multiple value transfer mode

FIGURE 8

A example of how power governors handle power zones in multiple-transfer mode. The governors in pink belong to one zone, while the governors in yellow belong to another zone. The last yellow power governor skips two numbers that are from another zone.

SYSTEM AND METHOD FOR CIRCULATING POWER USAGE INFORMATION ON A CLOSED RING COMMUNICATION PATH WITHIN A MULTI-NODE COMPUTER SYSTEM

CROSS-REFERENCE TO RELATED APPLICATIONS

This application contains subject matter which is related to the subject matter of the following co-pending applications, each of which is assigned to the same assignee as this application, International Business Machines Corporation of Armonk, N.Y. Each of the below listed applications is hereby incorporated herein by reference in its entirety:

Power Governor for DRAM in a Multi-node Computer System, Kevin Kark and Liyong Wang, U.S. Ser. No. 11/081,115, filed concurrently herewith.

TRADEMARKS

IBM® is a registered trademark of International Business Machines Corporation, Armonk, N.Y., U.S.A. while other names used herein may be registered trademarks, trademarks or product names of International Business Machines Corporation or other companies.

BACKGROUND OF THE INVENTION

1. Field of the Invention

This invention relates to computer system design and particularly to the systems having distributed multi-nodes that consume large amount of power but have limited centralized power supply.

2. Description of Background

Figure 1:
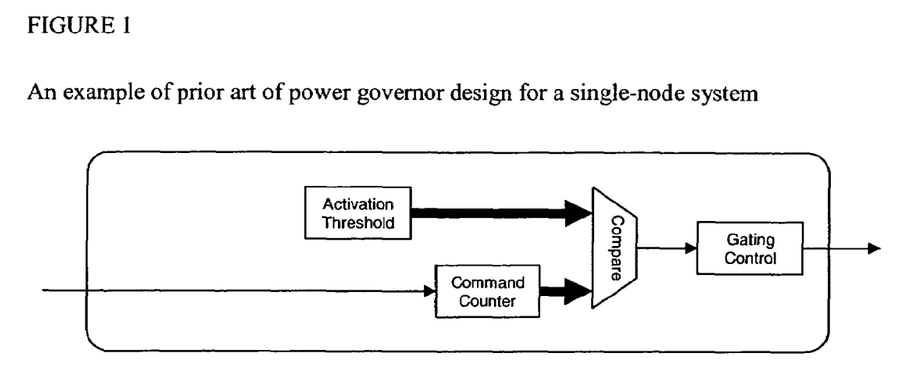
FIG. 1 illustrates one example of prior art of power governor design which we discussed in the background of the invention.

Power consumption has been one of the major battle areas for today's digital chip and system design. Demands for faster chips and bigger DRAM capacity, etc, are pushing the power supply to its capacity limit. How to keep the average current consumption low while maintain high system performance and efficiency brings to a significant challenge to today's system design. Heretofore, IBM provided the power governor control logic for a RAM subsystem of a computer processor, by utilizing the control logic described in IBM U.S. Pat. No. 6,667,929 of Vesselina K. Zaharinova-Papazova et al., incorporated herein by reference, which provides power governor control logic for a DRAM (Dynamic Random Access Memory) subsystem for indirectly measuring actual power consumption and decreasing the power consumption when the consumption exceeds a preset amount. This patent describes a way to count the number of memory accesses within a DRAM refresh period. If the total count exceeds a predefined threshold, then the power governor will be activated and thus slows down the subsequence memory access by artificially inserting idle commands between memory fetches and stores. Refer to FIG. 1 of this application for the block diagram of the implementation. The IBM z990 mainframe is the first system that equipped with this power governor. The z990 system has maximum capacity of four total nodes and each node can have up to four independent memory arrays. There are maximum of eight power governors in a system to control those memory arrays independently.

Since those power governors work independently, they do not have the complete awareness of the power usage for the entire system. We have learned that in an extreme case, a single memory access could burst into just one memory array in a node, while other memory arrays in the system are idle. The power governor belonging to this particular memory array could be activated, and its subsequent memory accesses slow down. However, the average memory activities and total current consumption in the whole system might be still well under the limit. In this case, the memory performance deteriorates unnecessarily. The memory system is not running at its maximum throughput.

SUMMARY OF THE INVENTION

The shortcomings of the prior art we have discovered are mitigated and additional enhancements are provided through the provision of a method that enables all the power governors within the system to work in concert so that each of the power governors has the knowledge of power consumption within the entire system. So enabled they control and limit the system usage based on a true overall measurement instead of just local measurement. Nevertheless, each of these power governors still has its own way to control/regulate its associated port. This preferred embodiment works well with various numbers of governors installed. It also supports a heterogeneous system, which could drive different current requirement. It is a very flexible design that produces the maximum accuracy, efficiency and performance.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 2:
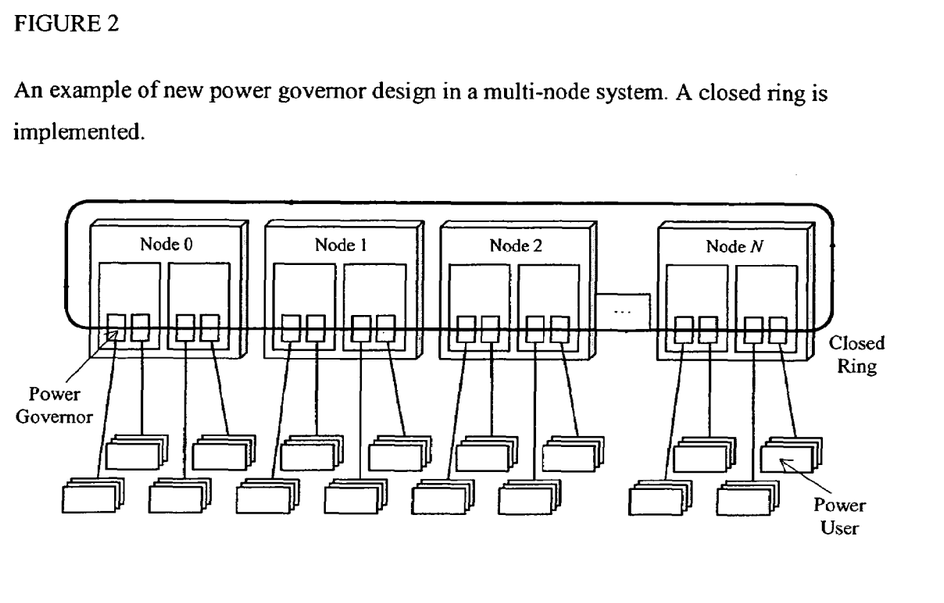
FIG. 2 illustrates a preferred example of the new power governor design, which establishes a closed-ring communication path among nodes.

As shown with reference to FIG. 2, in our preferred embodiment we have provided a method that allows all the power governors in the system to present their local power consumptions to other governors in a computer system. By exchanging the power consumption information, each power governor unit can have the global awareness of the total system power usage. We established a closed-ring communication path that interconnects all the power governors in the system as shown in FIG. 2. We have provided a plurality of nodes (0,1,2,3) arranged in a ring, each having a plurality of memory system controls MSC interfaces to a DRAM memory array. Since it is a closed ring, each of the power governors has its predecessor and successor. There is a System power usage number that circulates in this ring. The number represents the total power measurement of commands that has been utilized so far within the system. The time interval that the number rotates in the ring once is defined as number circulation period.

Figure 3:
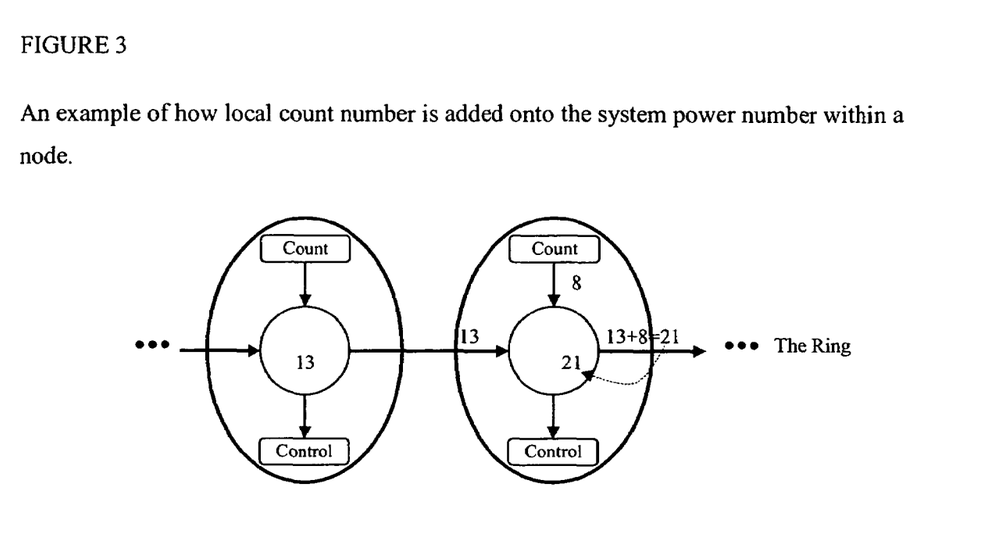
FIG. 3 illustrates a preferred example of how local count number is added onto the system power number in a node and how the result is passed to its successive node.

While the system power number is circulating in the ring, each governor also keeps counting on its local activities. Whenever a governor receives a measured value from its predecessor, it adds its local measurement on top of the power number and passes the result over to its successor. Meanwhile, it also saves this result for future usage as illustrated by FIG. 3 showing local counts added onto the system power number within a node and circulated on the ring by passing the result over to its successor on the ring.

Figure 4:
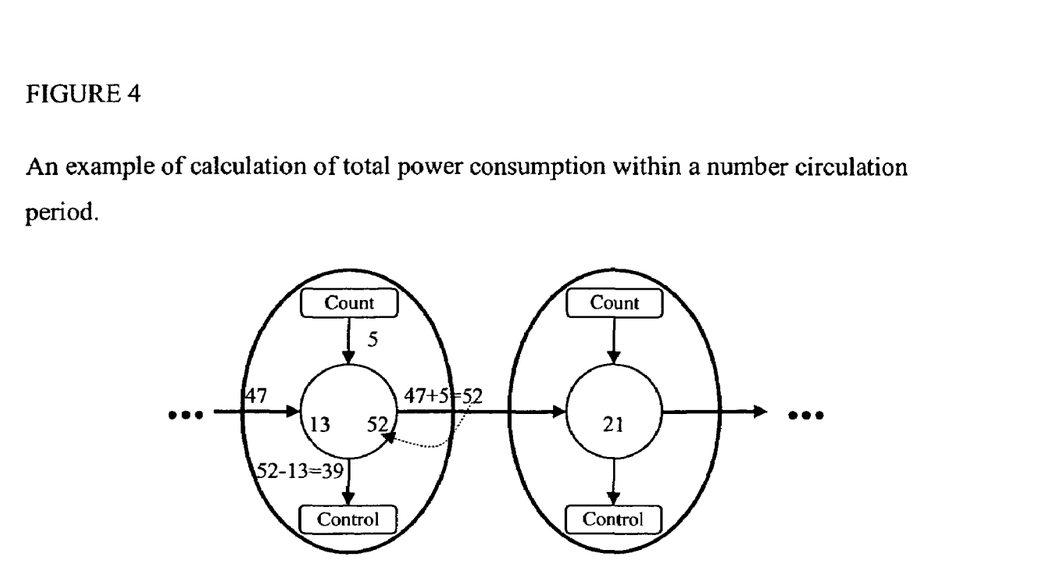
FIG. 4 illustrates a preferred example of how the total power consumption within a number circulation period is calculated.

At the end of each number circulation period, the system power number returns back to the originating power governor again. The governor will be able to determine the changes by comparing the incoming number versus the saved number. This increment is approximately the total measurement of power consumption in all other governors during a number circulation period as illustrated by FIG. 4. Now each of the power governors is able to aware of the overall system power consumption.

The power governor keeps accumulating the power consumption number for every number circulation period. After certain period, defined as a Counting Period, the governor then uses the total sum and compares it with a predefined threshold to determine if the governor will be activated and start regulating power usage of its associated node.

These two periods defined above, the number circulation period and the counting period, are two independent entities. The number circulation period is an indirect measurement of communication rate among the power governors. Therefore, it is preferred to have shorter circulation period, which translates to a higher communication rate. On the other hand, the counting period is related to how fast each power governor response to power usage. Longer period will make the governor less responsive to a power surge. However, longer counting period results in more accuracy in the power usage measurement. Since the power and thermal events are very slow events comparing to system cycle time, it is preferred to set the counting period to be reasonably long enough to maintain a fairly high accuracy to regulate the power. On the other hand, we want the number circulation period to be relatively short comparing to the counting period to maintain fairly high accuracy and smooth power number counting activities. While the number circulation period is essentially the same for all the power governors, the counting period on each governor could be set differently to each other.

We feel our governor architecture design is highly flexible and configurable. It supports multiple nodes and any number of governors in the system. It also supports different system configurations in each node. In addition, each governor unit can be configured differently as necessary for the different thermal characteristics and needs in each node.

Figure 5:
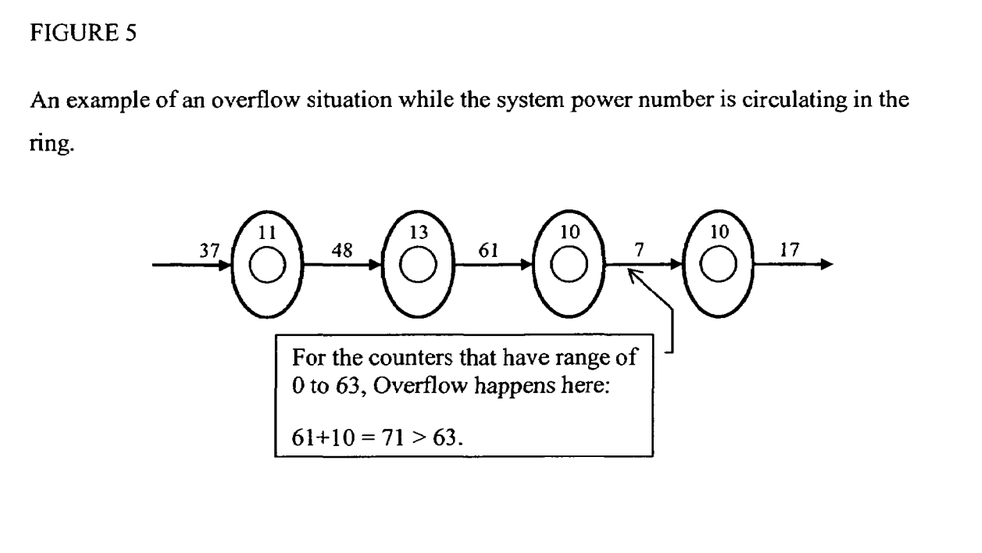
FIG. 5 illustrates an example of overflow situations while the system power number is accumulating in the ring.

Consideration of overflows. FIG. 5 is an example of an overflow situation while the system power number is circulating in the ring. An overflow happens if the hardware adder exceeds its counting capability. As shown before, the counters in power governors keep adding number on top of the system power number when the number passes through them. i.e. the usage number keeps incrementing monotonically. Special care is needed here since no real hardware can handle infinite numbers. However it is the fact that when the overflow does occur, the new counting result will become smaller then its previous values. FIG. 5 illustrates an example of this occurrence. A 6-bit adder was chosen here. So the maximum number the adder can handle is 63. Overflow occurs once this boundary is reached.

To handle the overflows correctly, a counter whose maximum count capacity is bigger than the maximum total system power number within a number circulation period is chosen. Since the number circulation period is predefined, once we choose a large counter, then it is certain that within one period, there could be only one possible overflow happened even with the maximum number of system power usage on all the nodes. When the receiving number from the predecessor is smaller than the local stored number, the governor will be aware that an overflow occurred somewhere in the past, and it will need to adjust the result when it does the number comparison.

Figure 6:
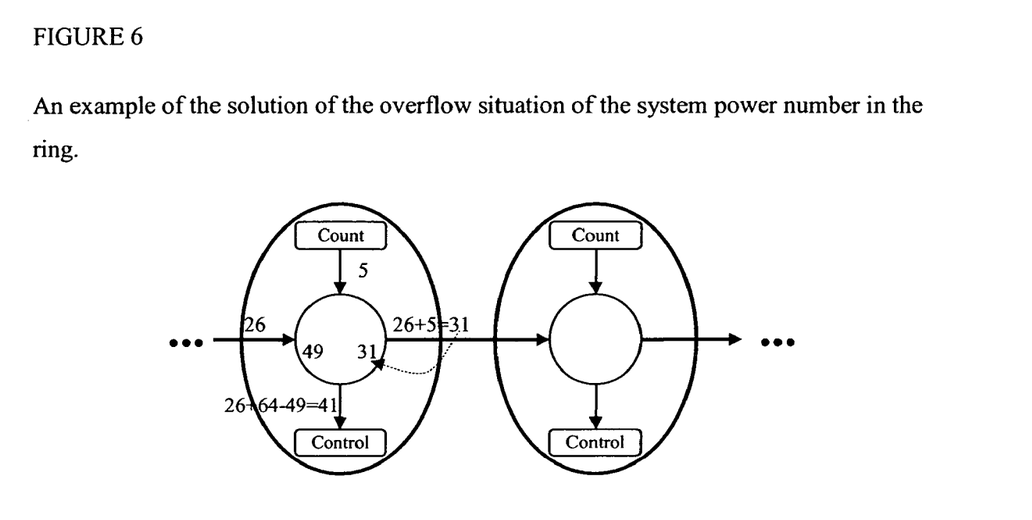
FIG. 6 illustrates an example of the solution of the overflow situation of the system power number in the ring.

As in an example illustrated in FIG. 6 of the overflow situation of the system power number in the ring. If one chooses the adder in the power governor to be a 6-bit binary adder, then its maximum counting range is from 0 to 63. The overflow threshold is 64. As illustrated below, if the current local number is 49 and the incoming data is 26, then the governor will aware that there was an overflow happened in the past round because 26 is smaller than 49. So when it calculates the result, it will add the value of the counter overflow threshold, which is 64, to 26 before it subtracts 49.

Single-Transfer Mode and the Token. In the single transfer mode that has been extensively described above, there is one and only one number circulating in the ring at any time. This number represents the total system power consumption. Since there is one and only one number/token that is circulating in the single value transfer mode, we have to make sure that there is only one circulating number out there in the ring at any time. In another word, one and only one power governor should be receiving, adding, handing and sending the measurement number at any time. During system reset, there is a need to initiate the number circulation, either by hardware or by software. Once circulation starts, a token lock mechanism is preferably applied to guarantee the token exclusiveness. A set of error detecting and reporting steps also can be used and should be in case the token is dropped or duplicated due to hardware malfunction.

Figure 7:
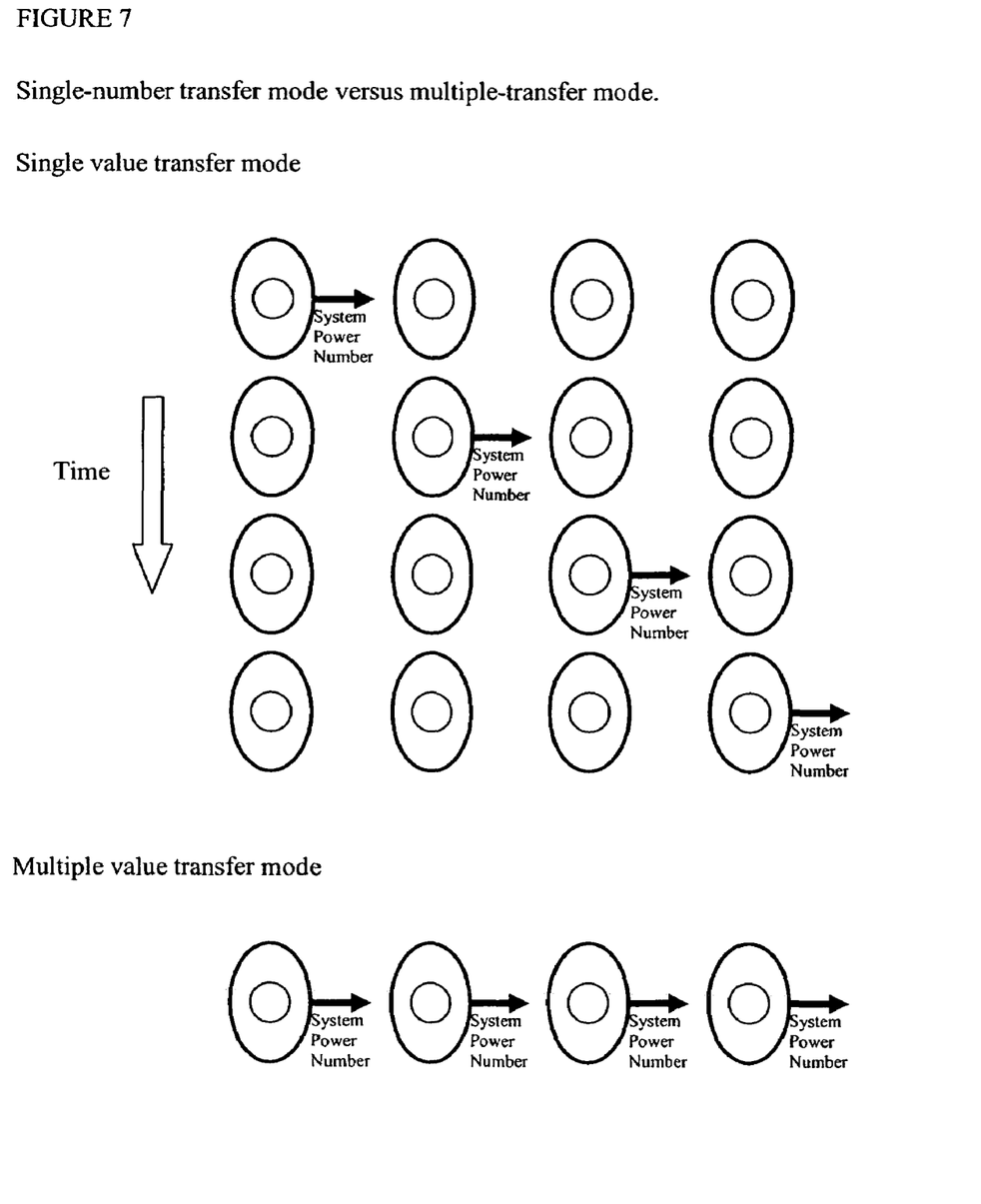
FIG. 7 illustrates a single number transfer mode vs. multiple number transfer mode in the ring.

Multiple-Transfer Mode. FIG. 7 illustrates a single number transfer as compared to a multiple transfer mode to illustrate that the system power number could be transferred among power governors in another way. In multiple number transfer mode, all the power governors receive, increment, handle and transmit the system power numbers in parallel (refer to FIG. 7). Each power governor still handles each of the numbers the same way as in single transfer mode. To get the final measurement in this mode, each power governor just needs to add up all the power numbers it received for a counting period. In this mode, all the power governors in the system work asynchronously so there is no need to maintain the exclusiveness of the single token in the ring for value transferring at all. However, each power governor should implement some queuing mechanism that can handle the unmatched throughput if the input connection rate to a governor is higher than the output rate from the governor. In such case, the governor should be able to buffer all the fast inputs from its predecessor.

Figure 8:
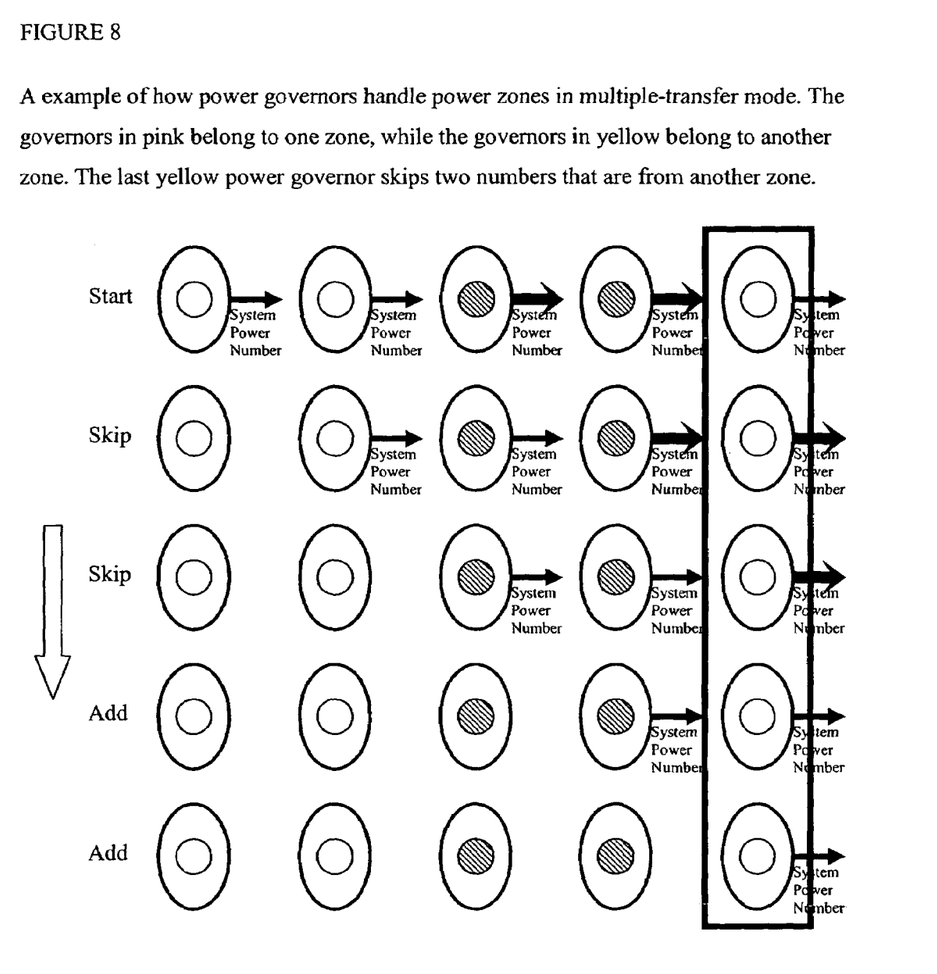
FIG. 8 illustrates the way that power governors handle power zones in a multiple-transfer mode.

In a multiple-transfer mode, the power governors could be group into power zones. The power governors in different zones are independent each other. A zone is defined as a power governor or a cluster of power governors. This is very useful if there are multiple power supplies which provide power to different system components within the system. To accomplish this, each of the power governors needs to aware the zone configurations within the system, since at system starts, each power governor will produce a system power number to its successor in sequence. Since each governor has the zone and chain picture locally, it can skip adding local count on the system numbers that are originated from the governors that do not belong to its power zone. By doing so, the system power numbers are isolated based on zones and each power governor only calculates the power usage within the zone.

Heterogeneous system configuration. This multi-node power governor design does not require the components on all the nodes in a system have the same configurations. Each component can have different power consuming rate, activation threshold. Since the system power number that the governor counts is the weight number that reflects the actual power usage of system commands, the counting number will increment in a different amount for each different type of node to reflect the actual unit power usage on each different configurations. The threshold of each of the governors can be also set independently based on its real power need. Each of the nodes can also be setup to have different degree of power limitation once they are active. Each of the power governors in nodes can be even disabled if reducing performance to save power is not preferred.

The capabilities of the present invention can be implemented in software, firmware, hardware or some combination thereof.

As one example, one or more aspects of the present invention can be included in an article of manufacture (e.g., one or more computer system products) having, for instance, computer usable media. The media has embodied therein, for instance, computer readable program code means for providing and facilitating the capabilities of the present invention. The article of manufacture can be included as a part of a larger distributed computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for regulating power consumption in a multi-node computer system, comprising the steps of:
    coupling a plurality of components of a multi-node computer system in a closed ring communication path,
    enabling a corresponding plurality of power governors for said plurality of components to exchange power usage information among themselves on said closed ring communication path and circulating a number for system power in the ring to accumulate for said components a total accumulated system power usage and regulating power usage of said power governors based on overall system power usage values provided by said total accumulated system power usage.

2. The method according to claim 1 wherein each of said plurality of power governor counts local power activities and adds this local count onto the number for system power when the number passes to it in the communication path.

3. The method according to claim 1 wherein each of said plurality of power governors calculate the total system power usage within a number circulation period by comparing the incoming number for system power versus a number it previously stored in a local activity store.

4. The method according to claim 3 wherein each of the plurality of power governors detect the overflow of the system power number by using a counter whose capacity is greater then the maximum total power consumption within a number circulating period, each power governor being enabled to detect an overflow condition if the incoming system power number is smaller than the number it previously stored.

5. The method according to claim 4 wherein the number for system power is adjusted by adding the counter capacity on top of the system power number when overflow is detected.

6. The method according to claim 5 wherein the number for system power is circulated in said communication path in a single number transfer mode to ensure the exclusivity of a single token of the number for system power.

7. The method according to claim 5 wherein the number for system power is circulated in a multiple value transfer mode in which all the power governors transfer the power measurement number in parallel.

8. The method according to claim 7 wherein the multi-node computer system is provided with a queuing mechanism for each power governor for buffering numbers for system power for unbalanced connection speed in said multiple value transfer mode.

9. The method according to claim 8 wherein said multi-node computer system has a plurality of heterogeneous node configurations.

* * * * *